US012569857B2

(12) United States Patent
Liao et al.

(10) Patent No.: US 12,569,857 B2
(45) Date of Patent: Mar. 10, 2026

(54) GRADING DISCHARGE MODULE, AND CONTINUOUS WET BALL-MILLING SEPARATION DEVICE AND SEPARATION METHOD

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

(72) Inventors: Changjian Liao, Dalian (CN); Fanfei Meng, Dalian (CN); Yong Piao, Dalian (CN); Jing Wang, Dalian (CN); Ping Jin, Dalian (CN); Zhiyu Liu, Dalian (CN); Haibo Wang, Dalian (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

( * ) Notice: Subject to any disclaimer, the term of this patent is extended or adjusted under 35 U.S.C. 154(b) by 299 days.

(21) Appl. No.: 18/262,561

(22) PCT Filed: Dec. 30, 2021

(86) PCT No.: PCT/CN2021/143150

§ 371 (c)(1),
(2) Date: Jul. 21, 2023

(87) PCT Pub. No.: WO2022/156511

PCT Pub. Date: Jul. 28, 2022

(65) Prior Publication Data

US 2024/0075480 A1 Mar. 7, 2024

(30) Foreign Application Priority Data

Jan. 22, 2021 (CN) ......................... 202110091053.9

(51) Int. Cl.
*B02C 17/18* (2006.01)
*B02C 17/10* (2006.01)
(Continued)

(52) U.S. Cl.
CPC ........ *B02C 17/1855* (2013.01); *B02C 17/161* (2013.01); *B02C 18/10* (2013.01); *B02C 23/36* (2013.01)

(58) Field of Classification Search
CPC ................ B02C 17/185; B02C 17/161; B02C 17/835; B02C 17/186; B02C 17/10;
(Continued)

(56) References Cited

U.S. PATENT DOCUMENTS 5,797,550 A 8/1998 Woodall et al.
8,205,817 B2 * 6/2012 Brook-Levinson .......................... B02C 17/163 241/170
(Continued)

FOREIGN PATENT DOCUMENTS

CN 2341714 Y * 10/1999
CN 2673505 Y 1/2005
(Continued)

OTHER PUBLICATIONS

English translate (CN2341714Y), retrieved date Jul. 15, 2025.*

*Primary Examiner* — Mohammed S. Alawadi
(74) *Attorney, Agent, or Firm* — NKL Law; Allen Xue

(57) ABSTRACT

A continuous wet ball-milling separation device has a cylinder, which has a feeding section, a shearing section, and a crushing section in sequence from top to bottom. The feeding section is located at the upper portion of the device,
(Continued)

and is provided with a liquid inlet, a material inlet, and a material distributor. The shearing section is located in the middle of the device, and is internally provided with shearing blades. The crushing section is located at the lower portion of the device, and is internally provided with stirring rods and crushing balls, and a grading discharge module is provided at the bottom of the crushing section. A grading discharge module is used in the device and a continuous wet ball-milling separation method applying the device. The device implements continuous operations of material crushing and grading by means of the material distributor, wet shearing, wet crushing, and wet grading.

19 Claims, 3 Drawing Sheets

(51) Int. Cl.

| | |
|---|---|
| ***B02C 17/16*** | (2006.01) |
| ***B02C 18/10*** | (2006.01) |
| ***B02C 23/16*** | (2006.01) |
| ***B02C 23/18*** | (2006.01) |
| ***B02C 23/36*** | (2006.01) |

(58) Field of Classification Search

CPC .............. B02C 17/1835; B02C 17/183; B02C 17/18; B02C 18/10; B02C 23/36; B02C 23/18; B02C 23/16

See application file for complete search history.

(56) References Cited

U.S. PATENT DOCUMENTS

| | | | | |
|---|---|---|---|---|
| 2015/0174585 | A1 | 6/2015 | Nied et al. | |
| 2018/0099254 | A1* | 4/2018 | Nater .................. | B01F 27/2713 |

FOREIGN PATENT DOCUMENTS

| | | | |
|---|---|---|---|
| CN | 104722368 | A | 6/2015 |
| CN | 104959196 | A | 10/2015 |
| CN | 104984790 | A | 10/2015 |
| CN | 105312128 | A | 2/2016 |
| CN | 106391219 | A | 2/2017 |
| CN | 209095776 | U | 7/2019 |
| CN | 211463359 | U | 9/2020 |
| CN | 212167757 | U | 12/2020 |
| GB | 1115515 | A | 5/1968 |
| JP | H05208172 | A | 8/1993 |
| JP | 2006334513 | A | 12/2006 |
| JP | 2008055288 | A | 3/2008 |
| JP | 2016073945 | A | 5/2016 |
| TW | 201210706 | A | 3/2012 |
| TW | I483787 | B | 5/2015 |
| WO | 2009024159 | A1 | 2/2009 |
| WO | 2010003990 | A1 | 1/2010 |
| WO | 2017000757 | A1 | 1/2017 |

* cited by examiner

GRADING DISCHARGE MODULE, AND CONTINUOUS WET BALL-MILLING SEPARATION DEVICE AND SEPARATION METHOD

CROSS-REFERENCE TO RELATED APPLICATIONS

This application is a U.S. national stage entry of PCT International Application No. PCT/CN2021/143150, filed on Dec. 30, 2021, which claims the benefit of priority from the Chinese Patent Application No. 202110091053.9 filed on Jan. 22, 2021, the content of which is incorporated herein by reference in its entirety.

FIELD

The present disclosure belongs to the technical field of milling with engineering machinery, and in particular relates to a continuous wet ball-milling separation device and a separation method thereof.

BACKGROUND

A vertical ball mill is suitable for milling and dispersing materials composed of coarse hard particles or materials exhibiting a false body phenomenon. A material milled by a vertical ball mill has a uniform and fine particle size. A vertical ball mill can also be used to mix several materials very homogeneously. A vertical ball can complete the milling and discharge the milled material quickly, and is easy to clean. Vertical ball mills are widely applied, mainly for milling various ores. Vertical ball mills are also a new type of energy-saving and environment-friendly mining machines and devices that have received great attention at home and abroad in recent years. Compared with conventional horizontal ball mills, vertical ball mills have the advantages of safer operation, lower power consumption, finer milled particles, lower noise and environmental friendliness, etc. Vertical ball mills are widely applied in cement material production, silicate product production, new building material production, refractory material production, chemical fertilizer production, ferrous metal ore dressing, glass ceramic material production, and other industries, and are used for dry or wet milling of various ores and other grindable materials. Wet vertical ball-milling may also be used for milling of flammable, explosive and heat-sensitive materials.

A novel vertical ball mill is disclosed in the Chinese Patent Application No. CN 211463359U. The disclosed ball mill comprises a shell with a feeding inlet at the top and a discharging outlet at the bottom, wherein an interlayer is arranged inside the shell for introducing and discharging a cooling medium, a motor is arranged in the shell to drive a rotating agitating shaft that includes a main shaft, and a plurality of vaned disks are arranged on the main shaft along the axis of the main shaft; a number of vane slots are uniformly distributed on vaned disk around the axis of the vaned disk, vanes are connected to the vane slots via the rotating shaft, the vanes rotate with the rotating shaft, and the rotating shaft can rotate with respect to the vane slots; one end of the rotating shaft extends into the vaned disks, is connected to the motor inside the vaned disks, and is driven by the motor to rotate. The ball mill operates intermittently, and has a drawback of uneven particle size of the discharged material.

A vertical ball-milling device suitable for the preparation of an epoxy molding compound is disclosed in the Chinese Patent Application No. CN 209095776U. The disclosed device comprises a pedestal, supports fixedly mounted on the pedestal, a bracket fixedly mounted on top of the supports, a driving motor fixedly mounted on the bracket via a motor base, and a ball-milling chamber mounted on one side of the supports via a fixing frame, wherein metal balls to be milled are loaded into the ball-milling chamber, an end cover is arranged on top of the ball-milling chamber, and a cooling cavity is arranged inside the wall of the ball-milling chamber. The utility model has a simple and reasonable structure and is convenient to use. It effectively solves the problem of unstable indexes in the production process of an epoxy molding compound, and can be used conveniently for high-speed material mixing and milling. The high heat generated during high-speed ball-milling can be cooled by means of a cooling chamber, through which cold water is circulated by a water-cooling circulation mechanism; the water inside the cooling chamber is cooled rapidly by means of a liquid nitrogen circulation pipeline and coiled copper tubes; thus, overheat in the ball-milling chamber is avoided. The inner cavity of the ball mill is provided with a screen for screening the discharged material. However, the screening is static, and the screen may be clogged easily.

When a wet-type vertical ball mill is used to mill an easily breakable, flammable, explosive or heat-sensitive material, it is necessary to solve the problems of the vertical ball mill, including intermittent discharging and clogging during discharging, etc.

CONTENTS OF THE DISCLOSURE

In view of the problems existing in the prior art, the present disclosure is intended to provide a grading discharge module, and a continuous wet ball-milling separation device, and a separation method.

According to a first aspect of the present disclosure, a grading discharge module is provided.

The grading discharge module in the present disclosure comprises a grading mesh plate and a grading wheel, wherein the grading mesh plate is sleeved outside the grading wheel;

- wherein the grading mesh plate has a cylinder structure, with a top cover arranged at a top end of the grading mesh plate and fixedly connected to a first rotating shaft; the cylinder wall of the grading mesh plate is provided with a plurality of first slits or holes; and the grading wheel has a cylinder structure, and the cylinder wall of the grading wheel is provided with a plurality of second slits or holes.

Optionally, the width or diameter of the second slits or holes is increased from the inner side to the outer side of the cylinder wall.

Optionally, the width or diameter of the second slits or holes at the inner side of the cylinder wall is 0.2-0.9 times that at the outer side of the cylinder wall.

Optionally, a discharging outlet is arranged at the bottom of the grading wheel.

Optionally, the area of the grading mesh plate where the first slits or holes are arranged is staggered from the area of the grading wheel where the second slits or holes are arranged in an axial direction.

Optionally, the cylinder structure of the grading mesh plate comprises a feeding section of the grading mesh plate, a grading section of the grading mesh plate and a discharging section of the grading mesh plate, which are arranged from top to bottom sequentially, wherein the cylinder wall of the feeding section of the grading mesh plate and the cylinder wall of the discharging section of the grading mesh plate are provided with the first slits or holes, while the cylinder wall of the grading section of the grading mesh plate is not provided with the first slits or holes.

Optionally, the grading wheel is divided into three sections from top to bottom, namely, an upper section of the grading wheel, a grading section and a lower section of the grading wheel; the cylinder wall of the upper section of the grading wheel and the cylinder wall of the lower section of the grading wheel are not provided with the second slits or holes, while the cylinder wall of the grading section is provided with the second slits or holes.

Optionally, the three sections of the grading mesh plate correspond to the three sections of the grading wheel in the vertical direction respectively.

According to a second aspect of the present disclosure, the present disclosure provides a continuous wet ball-milling separation device.

The continuous wet ball-milling separation device provided by the present disclosure comprises a cylinder, which comprises a feeding section, a shearing section and a crushing section arranged from top to bottom sequentially therein;

- the feeding section is located at the upper part of the ball-milling separation device and provided with a liquid inlet, a material inlet and a material distributor;
- the shearing section is located at the middle part (section) of the ball-milling separation device and provided with shearing blades therein; and
- the crushing section is located at the lower part of the ball-milling separation device and provided with stirring rods and crushing balls therein, and the grading discharge module described in the above technical scheme is arranged at the bottom of the crushing section.

Furthermore, the ball-milling separation device can be used for cooling, mixing, shearing, milling and graded separation of the material or liquid fed into the device. The ball-milling separation device preferably has a cylinder structure.

Furthermore, the liquid inlet and the material inlet are located in the top or upper cylinder wall of the ball-milling separation device, and the material distributor is located inside the cylinder. The material inlet is in communication with an inlet of the material distributor through a pipeline.

Furthermore, the shearing blades may be conventional ones in the art. Two to eight shearing blades may be arranged.

Furthermore, a motor is arranged outside the top of the cylinder, and a first rotating shaft is arranged along a central axis of the cylinder structure of the ball-milling separation device and extends through the feeding section, the shearing section and the crushing section. The shearing blades and the stirring rods are evenly distributed on the first rotating shaft and fixedly connected to the first rotating shaft; the crushing balls are loaded in bulk in the crushing section. The grading discharge module is arranged along the central axis of the crushing section.

Furthermore, the grading discharge module may have a conventional structure in the art. In the present disclosure, preferably a grading discharge module having a particular structure is used. The grading discharge module comprises a grading mesh plate and a grading wheel. The grading mesh plate is sleeved outside the grading wheel, and both the grading mesh plate and the grading wheel are coaxial (concentric) with the first rotating shaft. The grading mesh plate has a cylinder structure, with a top cover arranged at a top end of the grading mesh plate and fixedly connected to a first rotating shaft.

Therefore, the grading mesh plate also forms a rotating shaft of the crushing section (i.e., a lower section of the first rotating shaft), and the stirring rods are evenly distributed on the outer wall of the cylinder structure of the grading mesh plate. The cylinder wall of the grading mesh plate is provided with a plurality of first slits or holes, and the width or diameter of the slits or holes is smaller than the diameter of the crushing balls. The grading wheel also has a cylinder structure, the cylinder wall of the grading wheel is provided with a plurality of second slits or holes, the width or diameter of the second slits or holes on the cylinder wall of the grading wheel is increased from the inner side to the outer side (i.e., in the direction from the center of the circle to the circumference), and the width or diameter of the second slits or holes at the inner side is 0.2-0.9 times that at the outer side. Specifically, the width or diameter of the slits or holes at the inner side is usually 2 mm-15 mm. a sealing cover is provided on top of the grading wheel for blocking the material from entering the grading wheel from the top of the grading wheel. A discharging port is arranged at the bottom of the grading wheel, and the discharging port also serves as a second rotating shaft. The second rotating shaft can be connected to the grading motor through a rotating belt. The grading mesh plate and the grading wheel can be driven by the first rotating shaft and the second rotating shaft to rotate respectively.

Preferably, the cylinder structure of the grading mesh plate comprises a feeding section of the grading mesh plate, a grading section of the grading mesh plate and a discharging section of the grading mesh plate, which are arranged from top to bottom sequentially, wherein the cylinder wall of the feeding section of the grading mesh plate and the cylinder wall of the discharging section of the grading mesh plate are provided with the first slits or holes, while the cylinder wall of the grading section of the grading mesh plate is not provided with the first slits or holes. There is a gap between the lower edge of the discharging section of the grading mesh plate and the bottom plate of the device, and the height of the gap should be smaller than the diameter of the crushing balls, usually 0.5-0.8 times the diameter of the crushing balls. Preferably, the grading wheel is divided into three sections from top to bottom, namely, an upper section of the grading wheel, a grading section and a lower section of the grading wheel. The cylinder wall of the upper section and the cylinder wall of the lower section of the grading wheel are not provided with the second slits or holes, while the grading section is provided with the second slits or holes. The width or diameter of the second slits or holes in the cylinder wall of the grading section is increased from the inner side to the outer side. Specifically, the width or diameter of the slits or holes at the inner side is 0.2-0.9 times that at the outer side, and is usually 2 mm-15 mm. The slits or holes in the cylinder wall of the grading section can be used to separate particles in different particle sizes.

Further preferably, the three sections of the grading mesh plate correspond to the three sections of the grading wheel in the height direction (or in the vertical direction) respectively, which is to say, the feeding section, the grading section and the discharging section of the grading mesh plate are in one-to-one correspondence with the upper section, the grading section and the lower section of the grading wheel in the vertical direction respectively.

Furthermore, in the grading mesh plate, the width or diameter of the first slits or holes in the cylinder wall of the grading mesh plate (preferably the feeding section and the discharging section of the grading mesh plate) is usually 0.5-0.8 times the diameter of the crushing balls. The first slits or holes in the cylinder wall of the grading mesh plate are used as channels for the milled slurry.

Furthermore, the lower end of the discharging port of the grading wheel is provided with a rotary quick connector, and the other end of the rotary quick connector is in communication with a discharging pipe. The second rotating shaft extends through the bottom plate of the device and is connected to the grading motor.

Furthermore, the grading mesh plate is used to isolate the crushing balls to prevent them from entering the grading discharge module, and the grading wheel is used to separate the material powder meeting the particle size requirement.

Furthermore, the material entering the ball-milling separation device through the material inlet may be a solid material or hot liquid material, wherein the particle size of the solid material should be smaller than 50 mm.

Furthermore, that material distributor may be a pelletizer, extruder or an atomizer, etc., and is use to disperse the material in the ball-milling separation device.

Furthermore, the continuous wet ball-milling separation device provided by the present disclosure is suitable for milling, grading and separation of solid particles, such as solid activated carbon, insoluble solid sulfur, solid cement, pharmaceuticals and the like. The continuous wet ball-milling separation device provided by the present disclosure is especially suitable for quenching, shearing, milling, grading and separation of low-temperature molten insoluble sulfur.

According to a third aspect of the present disclosure, the present disclosure further provides a continuous wet ball-milling separation method, which utilizes the above-mentioned continuous wet ball-milling separation device.

Specifically, the continuous wet ball-milling separation method comprises the following steps:

(1) feeding a liquid continuously into the ball-milling separation device through the liquid inlet, controlling the liquid level in the ball-milling separation device, while discharging the liquid continuously from the ball-milling separation device through the discharging outlet;

(2) after the liquid level in the ball-milling separation device is controlled into a stable state, introducing a solid material or hot liquid material into the material distributor through the material inlet and then into the ball-milling separation device, cooling or mixing the bulk material dispersed in the liquid, shearing the cooled or mixed bulk material in the shearing section of the ball-milling separation device, and milling the cooled or mixed bulk material in the crushing section of the ball-milling separation device;

(3) in the milling process of the material, screening the material powder in size smaller than the width or diameter of the first slits or holes of the grading mesh plate into the grading mesh plate through the mesh plate, controlling the material powder and liquid in a particle size smaller than a target particle size (e.g., 100 meshes per inch (mpi)) to enter the grading wheel through the second slits or holes, and discharging the obtained material from the ball-milling separation device through the discharging port, a rotary quick connector, and a discharging pipe under the action of the rotating grading of the grading wheel;

(4) in the grading process, throwing the material powder in a particle size greater than the target particle size (e.g., 100 meshes per inch (mpi)) out of the grading wheel under the action of rotation of the grading wheel, wherein the material powder thrown out of the grading wheel collides with the inner wall of the grading section of the grading mesh plate; and the material powder in a particle size greater than the target particle size (e.g., 100 meshes per inch (mpi)) is discharged under the action of gravity through the grading mesh plate to the interior of the ball-milling separation device for further ball-milling.

The continuous wet ball-milling separation method in the present disclosure is especially suitable for quenching, shearing, milling and grading separation of low-temperature molten insoluble sulfur.

Compared with the prior art, the continuous wet ball-milling separation device and method provided by the present disclosure have the following advantages:

1. In the continuous wet ball-milling separation device in the present disclosure, a continuous operation processes of material cooling, mixing and milling is realized by means of material distribution by a material distributor, wet shearing and wet milling, and the material milling effect and efficiency are improved.
2. In the continuous wet ball-milling separation device in the present disclosure, material distribution, shearing, milling and grading discharge are completed in the ball-milling separation device, so that the material is directly converted into material powder meeting the requirement for the particle size of the product, thereby the graded screening of the discharged material after milling is avoided, the clogging of the system incurred by the material transfer between the existing milling machine and the existing grading screening machine is avoided, the process flow is simplified, and the uniformity of particle size distribution of the milled material is improved.
3. Compared with the conventional wet ball-milling and graded screening, the device provided by the present disclosure can realize continuous and complete milling of the material, decrease the range of particle size distribution of the milled material, improve the uniformity of the particle size of the milled material, and is suitable for large-scale continuous production. The production process has the characteristics of high safety and reliability, simple device and operation, low operating cost, and remarkable energy-saving effect, etc.

In the figures, the reference signs represent the following components: 1—material feeding pipeline, 2—material inlet, 3—liquid feeding pipeline, 4—liquid inlet, 5—motor, 6—material distributor, 7—ball-milling separation device, 8—first rotating shaft, 9—shearing blade, 10—stirring rod, 11—crushing ball, 12—grading mesh plate, 13—grading wheel, 14—discharging pipe, 15—rotary quick connector, 16—discharging port, 17—second slit or hole, 18—first slit or hole, 19—second rotating shaft, 20—top cover of the mesh plate, 21—feeding section of the mesh plate, 22—grading section of the mesh plate, 23—discharging section of the mesh plate, 24—grading motor, 25—rotating belt, A—feeding section of the ball-milling separation device, B—shearing section of the ball-milling separation device, C—crushing section of the ball-milling separation device, D—grading section of the grading wheel, E—upper section of the grading wheel, F—lower section of the grading wheel.

DETAILED DESCRIPTION

Hereunder the present disclosure will be further detailed in embodiments, but the present disclosure is not limited to those embodiments.

Embodiment 1

Figure 1:
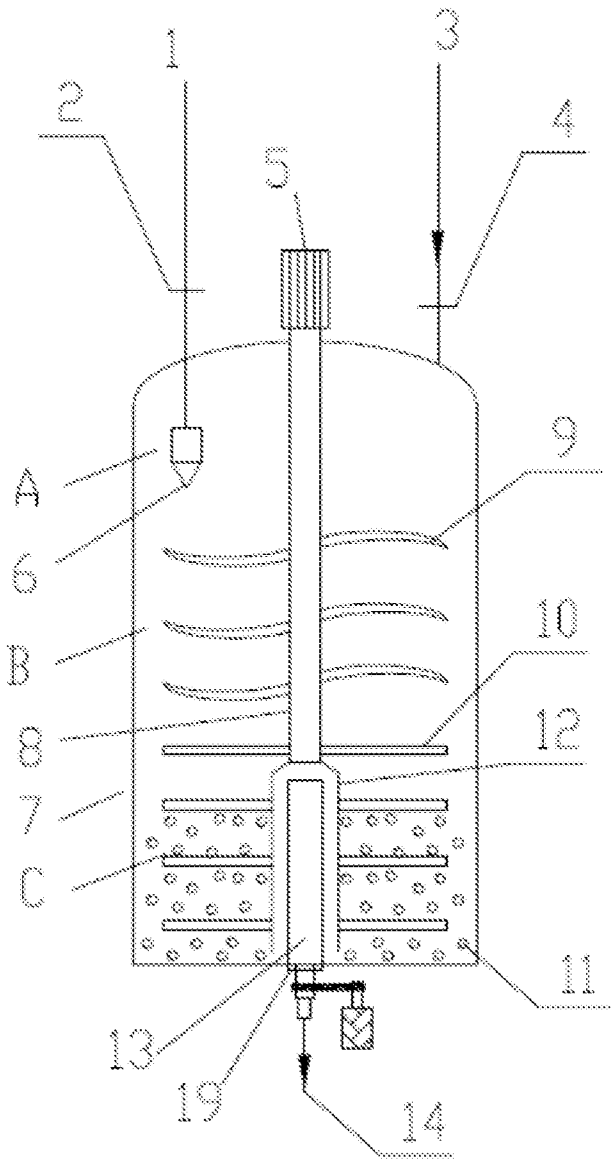
FIG. 1 is a schematic structural diagram of the continuous wet ball-milling separation device according to the present disclosure.

As shown in FIG. 1, the continuous wet ball-milling separation device in the present disclosure comprises a cylinder, for example, a cylindrical cylinder structure. The cylinder comprises a feeding section A, a shearing section B and a crushing section C arranged sequentially from top to bottom therein, and a grading discharge module is arranged in the crushing section C. The feeding section A is located at the upper part of the ball-milling separation device 7. The feeding section A is provided with a liquid inlet 4, a material inlet 2 and a material distributor 6. The shearing section B is located at the middle part of the ball-milling separation device 7 and provided with shearing blades 9 therein.

The crushing section C is located at the lower part of the ball-milling separation device 7 and provided with stirring rods 10 and crushing balls 11 therein, and the grading discharge module is arranged at the bottom of the crushing section C.

The liquid inlet 4 and the material inlet 2 are located in the top or upper cylinder wall of the ball-milling separation device 7, and the material distributor 6 is located inside the cylinder. The material inlet 2 is in communication with an inlet of the material distributor 6 through a pipeline.

Furthermore, the shearing blades 9 may be conventional ones in the art. Two to eight shearing blades 9 may be arranged.

Furthermore, a motor 5 is arranged outside the top of the cylinder, and a first rotating shaft 8 is arranged along a central axis of the cylinder structure of the ball-milling separation device 7 and extends through the feeding section A, the shearing section B and the crushing section C. The shearing blades 9 and the stirring rods 10 are evenly distributed on the first rotating shaft 8 and fixedly connected to the first rotating shaft 8. The crushing balls 11 are loaded in bulk in the crushing section C. The grading discharge module is arranged along the central axis of the crushing section C.

Figure 2:
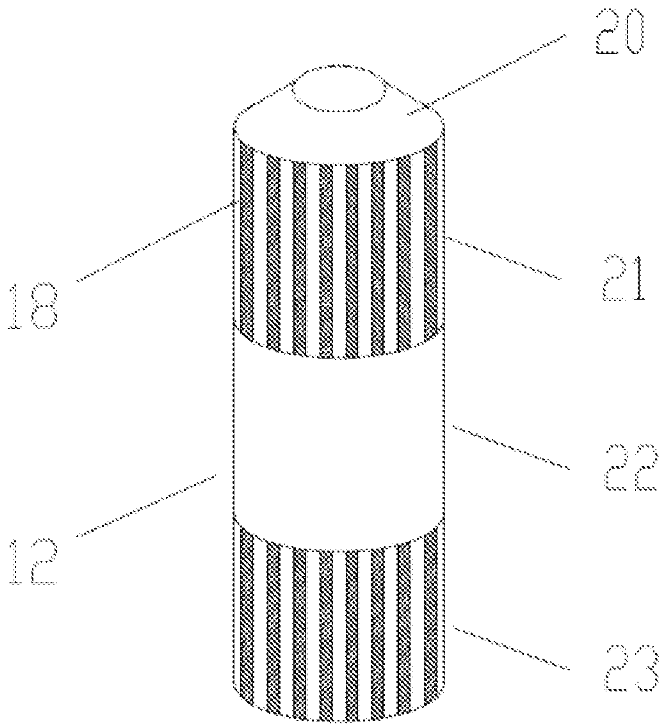
FIG. 2 is a schematic structural diagram of the grading mesh plate in the continuous wet ball-milling separation device according to the present disclosure.
Figure 3:
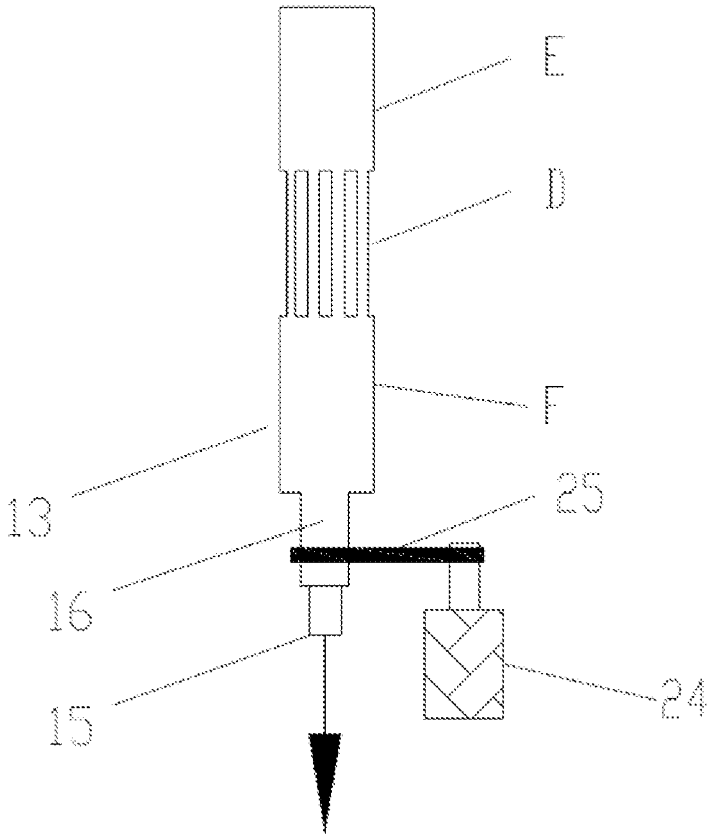
FIG. 3 is a schematic structural diagram of the grading wheel in the continuous wet ball-milling separation device according to the present disclosure.

As shown in FIGS. 2-3, the grading discharge module comprises a grading mesh plate 12 and a grading wheel 13. The grading mesh plate 12 is sleeved outside the grading wheel 13, and both the grading mesh plate 12 and the grading wheel 13 are coaxial (concentric) with the first rotating shaft 8. The grading mesh plate 12 has a cylinder structure, with a top cover 20 arranged at a top end of the grading mesh plate 12 and fixedly connected to a first rotating shaft 8. The cylinder wall of the grading mesh plate 12 is provided with a plurality of first slits or holes 18, and the width or diameter of the slits or holes is smaller than the diameter of the crushing balls 11. Stirring rods 10 are evenly distributed on the outer wall of the cylinder structure of the grading mesh plate 12. The grading wheel 13 also has a cylinder structure, and the cylinder wall of the grading wheel 13 is provided with a plurality of second slits or holes 17. The width or diameter of the second slits or holes 17 in the cylinder wall of the grading wheel 13 is increased from the inner side to the outer side, and the width or diameter of the second slits or holes in the cylinder wall at the inner side is 0.2-0.9 times that at the outer side, and is usually 2 mm-15 mm. The lower section F of the grading wheel is fixedly connected to the second rotating shaft 19, and a discharging port 16 is arranged at the bottom of the grading wheel 13. The grading mesh plate 12 and the grading wheel 13 can be driven by the first rotating shaft 8 and the second rotating shaft 9 to rotate respectively.

Furthermore, the lower end of the discharging port 16 of the grading wheel 12 is provided with a rotary quick connector 15, and the other end of the rotary quick connector 15 is in communication with a discharging pipe 14. The second rotating shaft 19 penetrates the bottom plate of the device 7 and can be connected to the grading motor 24 through a rotating belt (e.g., a pulley belt) 25.

In the present disclosure, the grading mesh plate 12 is used to isolate the crushing balls 11 to prevent them from entering the grading discharge module, and the grading wheel 13 is used to separate the material powder meeting the particle size requirement.

The material entering the ball-milling separation device 7 through the material inlet 2 may be a solid material or hot liquid material. The particle size of the solid material should be smaller than 50 mm.

The material distributor 6 may be a conventional structure such as a pelletizer, extruder or atomizer, and is used to disperse the material in the ball-milling separation device 7.

Embodiment 2

As shown in FIG. 2, in an embodiment of the present disclosure, the cylinder structure of the grading mesh plate 12 comprises a feeding section 21 of the grading mesh plate, a grading section 22 of the grading mesh plate and a discharging section 23 of the grading mesh plate, which are arranged from top to bottom sequentially, wherein the cylinder wall of the feeding section 21 of the grading mesh plate and the cylinder wall of the discharging section 23 of the grading mesh plate are provided with the first slits or holes 18, while the cylinder wall of the grading section 22 of the grading mesh plate is not provided with the first slits or holes. There is a gap between the lower edge of the discharging section 23 of the grading mesh plate and the bottom plate of the device 7, and the height of the gap should be smaller than the diameter of the crushing balls 11, usually 0.5-0.8 times the diameter of the crushing balls 11.

Figure 4:
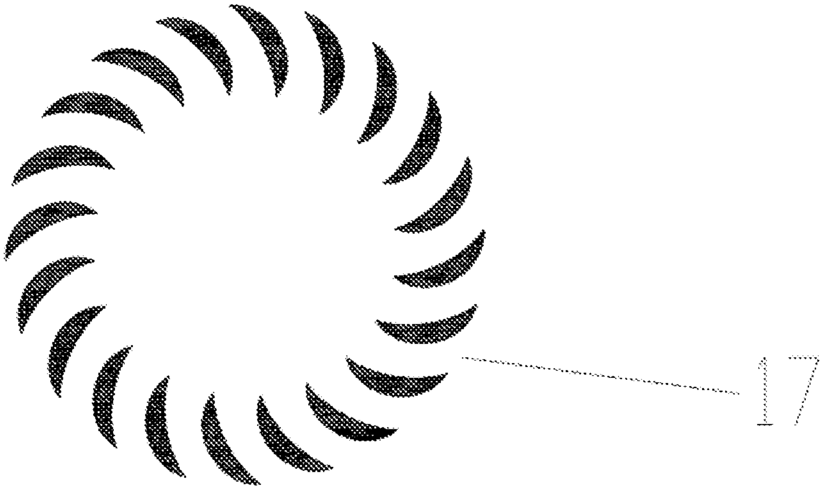
FIG. 4 is an isometric diagram of the second slits of the grading wheel in the continuous wet ball-milling separation device according to the present disclosure.

As shown in FIGS. 3-4, the grading wheel can also be divided into three sections from top to bottom, namely, an upper section E, a grading section D and a lower section F of the grading wheel. The cylinder wall of the upper section E and the cylinder wall of the lower section F of the grading wheel are not provided with the second slits or holes 17, while the grading section D is provided with the second slits or holes 17. The width of the second slits in the cylinder wall of the grading wheel 12 is increased from the inner to the outer side; specifically, the width of the slits at the inner side is 0.2-0.9 times that at the outer side, and usually is 2 mm-15 mm. The slits of the grading section D are used to separate the material in different particle sizes. Further preferably, the three sections of the grading mesh plate 12 correspond to the three sections of the grading wheel 13 in the vertical direction respectively, which is to say, the feeding section 21, the grading section 22 and the discharging section 23 of the grading mesh plate 12 are in one-to-one correspondence with the upper section E, the grading section D and the lower section F of the grading wheel 12 in the vertical direction respectively.

Furthermore, in the grading mesh plate 12, the feeding section 21 and the discharging section 23 of the grading mesh plate are provided with a plurality of first slits or holes 18, and the width or diameter of the first slits or holes is usually 0.5-0.8 times the diameter of the crushing balls 11, and the second slits or holes 18 are used as channels for the milled slurry.

Embodiment 3

As shown in the accompanying drawings, the present disclosure provides a continuous wet ball-milling separation method.

Specifically, the continuous wet ball-milling separation method comprises the following steps: feeding a liquid continuously into the ball-milling separation device 7 through the liquid inlet 4, controlling the liquid level in the ball-milling separation device 7, while discharging the liquid continuously from the ball-milling separation device 7 through the discharging outlet 16; after the liquid level in the ball-milling separation device 7 is controlled into a stable state, feeding the material into the material distributor 6 through the material inlet 2 then into the ball-milling separation device 7, and cooling or mixing the dispersed materials in the liquid; shearing the cooled and mixed dispersed material in the shearing section B, and then milling the material in the crushing section C. In the milling process of the material, the material powder in a particle size smaller than the width or diameter of the first slits or holes enters the grading mesh plate 12 through the first slits or holes, and the material powder in a particle size smaller than 100 meshes per inch (mpi) enters the grading wheel 13 through the second slits or holes 17 and is discharged out of the ball-milling separation device 7 through the discharge port 16, the rotary quick connector 15 and the discharge pipe 14 under the rotating and grading action of the grading wheel 13; in the grading process, the material powder in a particle size greater than 100 meshes per inch (mpi) is thrown out of the grading wheel 13 by the centrifugal force under the rotating action of the grading wheel 13 and collides with the inner wall of the grading section 22 of the grading mesh plate, and, under the action of gravity, is discharged through the discharging section 23 of the grading mesh plate into the ball-milling separation device 7 for further ball-milling.

Embodiment 4

As shown in the accompanying drawings, the present disclosure provides a method for continuous ball-milling separation of insoluble sulfur. A quenching liquid continuously enters the ball-milling separation device 7 through the liquid inlet 4. The liquid level of the quenching liquid in the ball-milling separation device 7 is controlled, while the quenching liquid is continuously discharged from the ball-milling separation device 7 through the discharging port 16. After the level of quenching liquid in the ball-milling separation device 7 is controlled into a stable state, high-temperature (molten) sulfur at 250° C.-300° C. is fed into the ball-milling separation device 7 through the material distributor 6. The dispersed sulfur enters the quenching liquid and is quenched. The quenched dispersed sulfur is sheared in the shearing section B of the ball-milling separation device and then milled in the crushing section C of the ball-milling separation device 7. In the milling process of the sulfur, sulfur powder in a particle size smaller than the aperture of the slits (holes) of the grading mesh plate enters the grading mesh plate 12 through the first slits (or holes). Under the rotating grading action of the grading wheel 13, the sulfur powder in a particle size smaller than 100 meshes per inch (mpi) enters the grading wheel 13 through the second slits, and is discharged out of the ball-milling separation device 7 through the discharging port 16, the rotating quick connector 15 and the discharging pipe 14. In the grading process, the material powder in a particle size greater than 100 meshes per inch (mpi) is thrown out of the grading wheel 13 under the action of rotation of the grading wheel 13, and collides with the inner wall of the grading section 22 of the grading mesh plate; while the material powder in a particle size greater than 100 meshes per inch (mpi) is discharged under the action of gravity through the discharging section 23 of the grading mesh plate to the interior of the ball-milling separation device 7 for further ball-milling. With the device provided by the present disclosure, high-temperature sulfur and quenching liquid can be continuously fed and discharged, the insoluble sulfur can be continuously quenched and milled, and sulfur powder meeting the particle size requirement of 100 meshes per inch (mpi) can be obtained.

The following table shows the particle size distribution of sulfur powder prepared with the continuous wet ball-milling separation device in the technical scheme of the present disclosure. In the prepared sulfur powder, particles in a particle size smaller than 150 μm accounts for 98.21 vol. %, and particles in a particle size between 140 μm and 150 μm accounts for 70.32 vol. %, which is to say, the uniformity of particle size is high.

| Particle Size (μm) | Vol. % or lower |
|---|---|
| 100 | 0.08 |
| 105 | 0.18 |
| 110 | 0.31 |
| 115 | 0.49 |
| 120 | 1.38 |
| 125 | 2.51 |
| 130 | 8.55 |
| 135 | 15.65 |
| 140 | 27.89 |
| 145 | 89.23 |
| 150 | 98.21 |
| 155 | 100 |
| 160 | 100 |
| 165 | 100 |
| 170 | 100 |
| 175 | 100 |

The invention claimed is:

1. A grading discharge module, comprising a grading mesh plate and a grading wheel, wherein:

the grading mesh plate is sleeved outside the grading wheel, the grading mesh plate is cylindrical in shape and has a top cover arranged at a top end of the grading mesh plate and fixedly connected to a first rotating shaft, the grading mesh plate comprises a feeding section, a grading section, and a discharging section, which are arranged from top to bottom sequentially, a wall of the feeding section and a wall of the discharging section are provided with a plurality of first openings, and a wall of the grading section is free of an opening, the grading wheel is cylindrical in shape and a wall of the grading wheel is provided with a plurality of second openings, and each of the plurality of first openings and the plurality of second openings is in shape of a slit or a hole.

2. The grading discharge module of claim 1, wherein an outer width or diameter of each second opening at an outer surface of the wall of the grading wheel is larger than an inner width or diameter thereof at an inner surface of the wall.

3. The grading discharge module of claim 2, wherein a ratio of the inner width or diameter to the outer width or diameter is 0.2-0.9.

4. The grading discharge module of claim 1, wherein a discharging outlet is arranged at a bottom of the grading wheel.

5. The grading discharge module of claim 1, wherein an area of the grading mesh plate where the plurality of first openings are arranged is staggered from an area of the grading wheel where the plurality of second openings are arranged in an axial direction.

6. The grading discharge module of claim 1, wherein the grading wheel comprises, from top to bottom, an upper section, a grading section, and a lower section, a wall of the upper section of the grading wheel and a wall of the lower section of the grading wheel are free of openings, and a wall of the grading section is provided with the plurality of second openings.

7. The grading discharge module of claim 1, wherein the feeding section, the grading section, and the discharging section, of the grading mesh plate correspond to the upper section, the grading section, and the lower section of the grading wheel, respectively.

8. A continuous wet ball-milling separation device, comprising a feeding section of the ball-milling separation device, a shearing section and a crushing section arranged from top to bottom sequentially, wherein:

the crushing section comprises the grading discharge module of claim 1 disposed in a bottom of the crushing section, the feeding section of the ball-milling separation device is located at the upper part of the ball-milling separation device, and is provided with a liquid inlet, a material inlet, and a material distributor, the shearing section is located at the middle part of the ball-milling separation device and is provided with shearing blades therein, and the crushing section is located at the lower part of the ball-milling separation device and is provided with a plurality of stirring rods and a plurality of crushing balls therein.

9. The continuous wet ball-milling separation device of claim 8, wherein the ball-milling separation device has a cylindrical structure.

10. The continuous wet ball-milling separation device of claim 9, wherein the liquid inlet and the material inlet are located in a top or an upper part of the ball-milling separation device, the material distributor is located inside the cylindrical structure, and the material inlet is in communication with an inlet of the material distributor through a pipeline.

11. The continuous wet ball-milling separation device of claim 9, wherein a motor is arranged outside a top of the cylindrical structure, and the first rotating shaft is arranged along a central axis of the cylindrical structure and extends through the feeding section of the ball-milling separation device, the shearing section, and the crushing section.

12. The continuous wet ball-milling separation device of claim 11, wherein the plurality of shearing blades and the plurality of stirring rods are evenly distributed on the first rotating shaft and fixedly connected to the first rotating shaft, the plurality of crushing balls are loaded in the crushing section, and the grading discharge module is located along the central axis of the crushing section.

13. The continuous wet ball-milling separation device of claim 12, wherein the discharging outlet serves as a second rotating shaft.

14. The continuous wet ball-milling separation device of claim 13, wherein the grading mesh plate and the grading wheel are driven by the first rotating shaft and the second rotating shaft to rotate, respectively.

15. The continuous wet ball-milling separation device of claim 11, wherein both the grading mesh plate and the grading wheel are coaxial with the first rotating shaft.

16. The continuous wet ball-milling separation device of claim 15, wherein a width or diameter of the plurality of first openings is smaller than a diameter of the plurality of crushing balls, and/or, wherein the grading mesh plate forms the rotating shaft of the crushing section, and the plurality of stirring rods are evenly distributed on the outer wall of the grading mesh plate.

17. The continuous wet ball-milling separation device of claim 8, wherein a gap between a lower edge of the discharging section of the grading mesh plate and a bottom plate of the device is smaller than a diameter of the plurality of crushing balls.

18. The continuous wet ball-milling separation device of claim 17, wherein the width or diameter of the plurality of the first openings in the grading mesh plate is 0.5-0.8 times the diameter of the plurality of crushing balls.

19. A continuous wet ball-milling separation method utilizing the continuous wet ball-milling separation device of claim 8, comprising the following steps:

S1: feeding a liquid continuously into the ball-milling separation device through the liquid inlet, controlling the liquid level in the ball-milling separation device, while discharging the liquid continuously from the ball-milling separation device through a discharging outlet;

S2: after the liquid level in the ball-milling separation device is controlled into a stable state, introducing a material into the material distributor through the material inlet and then into the ball-milling separation device, cooling or mixing the bulk material dispersed in the liquid, and shearing the cooled or mixed bulk material in the shearing section of the ball-milling separation device;

S3: milling the cooled or mixed bulk material in the crushing section of the ball-milling separation device, which comprises screening a material powder in size smaller than a width or diameter of the first slits or holes of the grading mesh plate into the grading mesh plate through the mesh plate, controlling the material powder and liquid in a particle size smaller than a target particle size to enter the grading wheel through the second slits or holes, and discharging a material obtained from the ball-milling separation device through the discharging outlet when the grading wheel rotates; and S4: introducing the material powder in a particle size greater than the target particle size out of the grading wheel when the grading wheel rotates, wherein the material powder discharged from the grading wheel collides with an inner wall of the grading section of the grading mesh plate; and the material powder in the particle size greater than the target particle size is discharged under gravity through the grading mesh plate to an interior of the ball-milling separation device for further ball-milling.

* * * * *